Sept. 1, 1925.                                           1,551,734
J. A. DICKEL
ATTACHMENT FOR HOGPENS
Filed Oct. 10, 1924        3 Sheets-Sheet 1
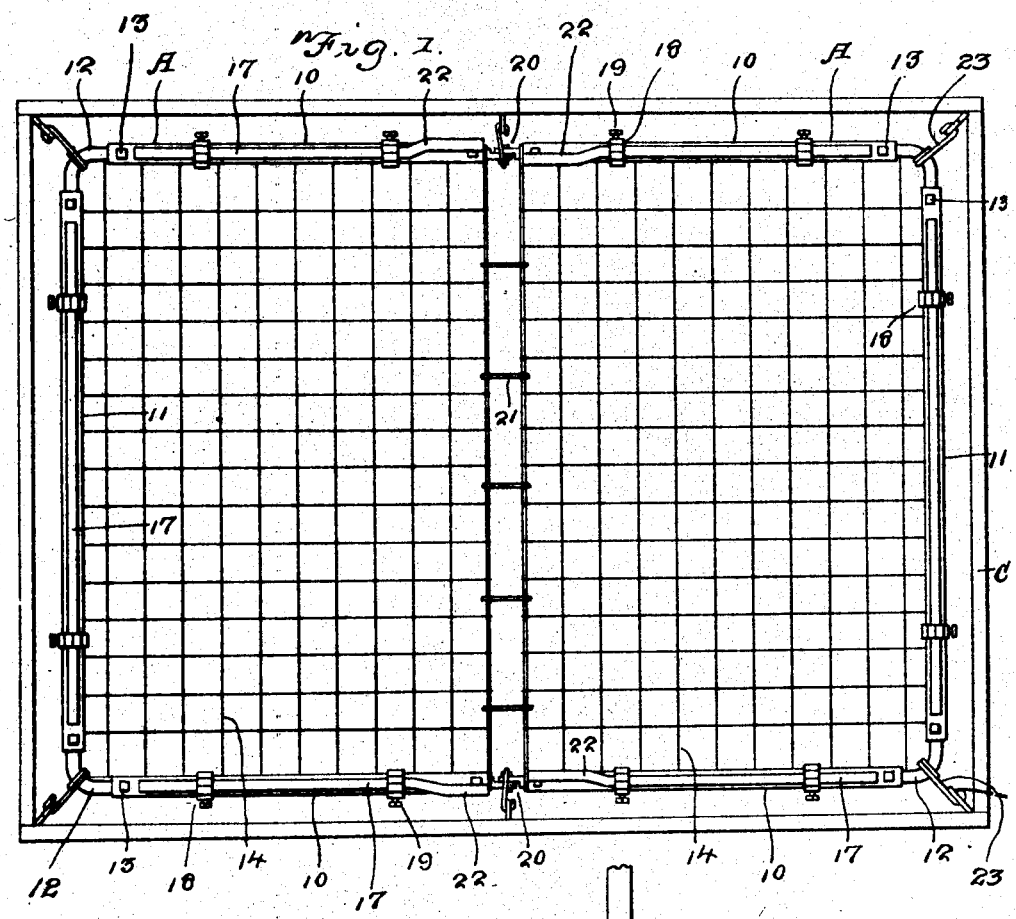
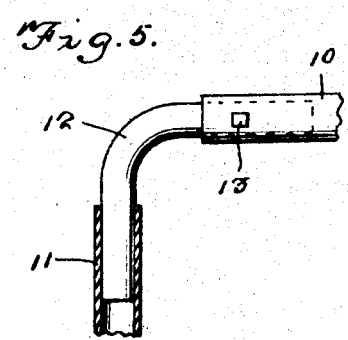
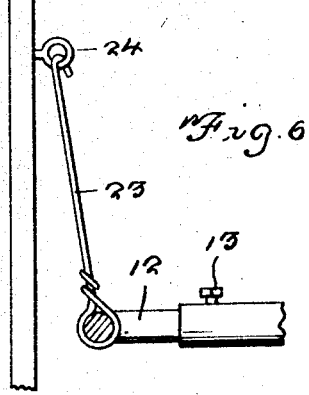
J. A. Dickel
INVENTOR
BY Victor J. Evans
ATTORNEY
WITNESS:
E. R. Ruppert

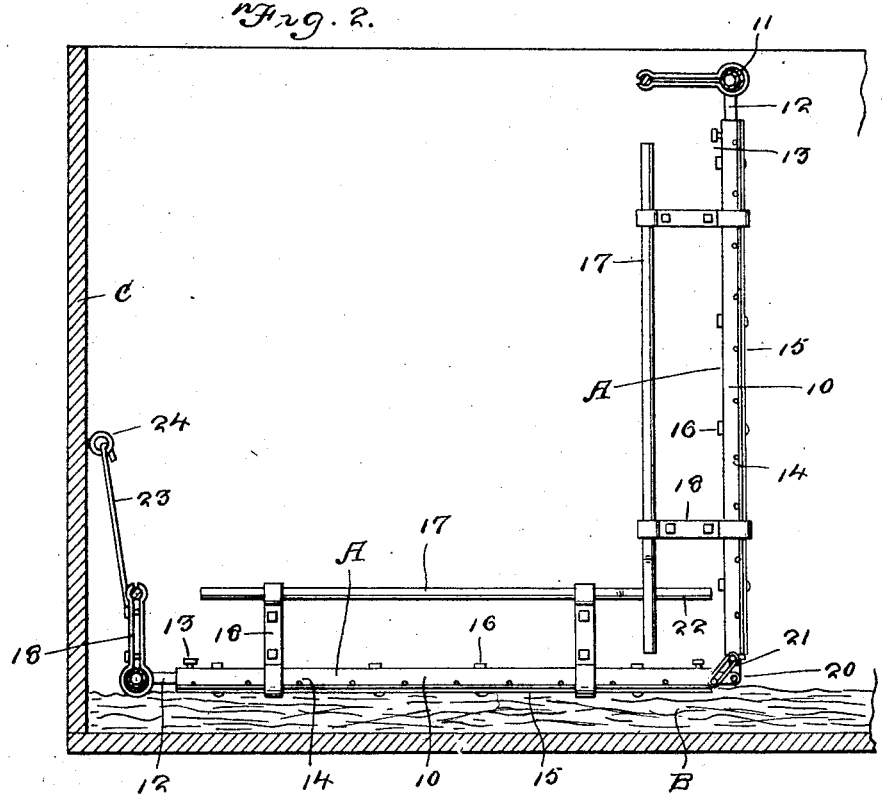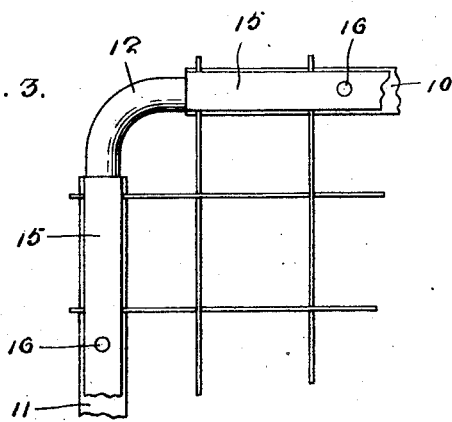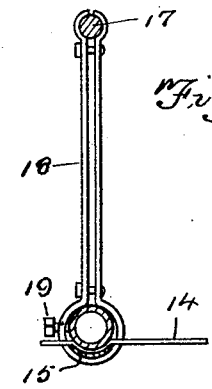

Sept. 1, 1925.  J. A. DICKEL  1,551,734
ATTACHMENT FOR HOGPENS
Filed Oct. 10, 1924   3 Sheets-Sheet 3

Patented Sept. 1, 1925.

1,551,734

UNITED STATES PATENT OFFICE.

JAMES A. DICKEL, OF OTTUMWA, IOWA.

ATTACHMENT FOR HOGPENS.

Application filed October 10, 1924. Serial No. 742,870.

*To all whom it may concern:*

Be it known that I, JAMES A. DICKEL, a citizen of the United States, residing at Ottumwa, in the county of Wapello and State of Iowa, have invented new and useful Improvements in Attachments for Hogpens, of which the following is a specification.

This invention relates to devices for use in farrowing pens and has for an object the provision of means which may be removably secured in place to prevent young pigs from crawling under the bedding and protect them from possible injury by the sow.

Another object of the invention is the provision of a device by means of which the bedding may be covered in such manner as to prevent the sow from piling it up.

Another object of the invention is the provision of a device which, in addition to its other uses and advantages, may be arranged to provide a partition for the pen, so that the sow may be confined in one end of said pen while the bedding in the opposite end is being renewed.

With the above and other objects in view, the invention further includes the following novel features and details of construction, to be hereinafter more fully described, illustrated in the accompanying drawings and pointed out in the appended claims.

In the drawings:—

Figure 1 is a plan view of the pen with the invention shown in position for use.

Figure 2 is an enlarged vertical sectional view showing one section of the device arranged to form a partition for the pen.

Figure 3 is an enlarged fragmentary bottom plan view showing the manner of attaching the wire netting to the frame.

Figure 4 is an enlarged fragmentary sectional view through the frame and illustrating the means of securing the guard rails in position.

Figure 5 is an enlarged fragmentary section showing the adjustable connection at the corners of the frame.

Figure 6 is a detail view showing the manner of attaching the frame to the pen.

Figure 7:
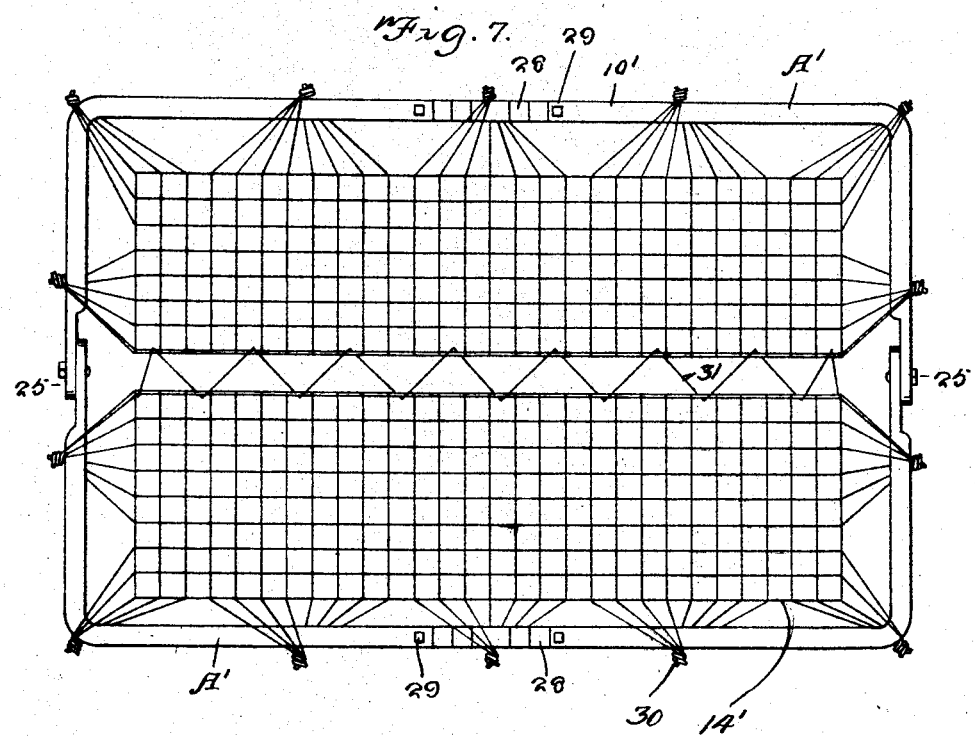
Figure 7 is a plan view of a modified form of the invention.

Referring to the drawings in detail wherein like characters of reference denote corresponding parts, the invention which is shown as arranged for use within a pen includes separate frame sections A. These sections are substantially U-shaped and include tubular end members 10 and tubular side members 11, the latter being adjustably connected to the former by substantially L-shaped couplings 12 which are removably and adjustably held in place within the adjacent ends of the side and end members by set screws 13. The frame sections A may thus be adjusted to the desired size.

The frame sections A are covered with a wire netting 14, the edges of which are secured to the side and end members by transversely curved clamping plates 15 which are removably secured in place by bolts 16 which pass through the side and end members, or any other suitable securing means.

Extending inwardly along and disposed parallel with the side and end members of each frame section A are guard rails 17. These rails are adjustably secured to the side and end members of the frame by means of clamping arms 18, one end of which receives the guard rails 17, while the opposite ends of these clamping arms engage over the side and end members and are held against pivotal movement upon said members by means of set screws 19. Thus the guard rails may be adjusted pivotally upon the side and end members.

The side members 11 of the frame sections A are hingedly connected together as indicated at 20, while the adjacent edges of the wire netting 14 are connected as indicated at 21, so that a rectangular frame is formed which is entirely covered by the netting 14 and whose side and end members are provided with inwardly extending guard rails, the guard rails of the side members of the frame being of sectional formation. The adjacent ends of the guard rails of the side members of the frame are offset as indicated at 22, the purpose being to prevent contact between the adjacent ends of these members when the frame sections are moved pivotally for a purpose hereinafter mentioned.

Each corner of the frame is provided with a hoop 23 which may be removably engaged with eyes or similar members 24, whereby the frame may be removably secured to the walls of the pen.

The device is arranged within the pen spaced above the floor, the space beneath the device being occupied by the bedding which is indicated at B, while the walls of the pen are indicated at C. The device will thus act to prevent the sow from piling up the bedding and will prevent the young pigs from crawling under the bedding with a possible resultant injury by the sow, or the liability of becoming chilled through contact with the cold floor of the pen.

When it is desired to renew the bedding, one frame section A may be detached and the sow driven to the opposite end of the pen, the detached frame section being then raised and secured in raised position so as to provide a partition to confine the sow in one end of the pen while the bedding at the opposite end is being renewed.

Figure 8:
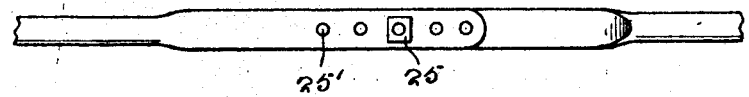
Figure 8 is an enlarged fragmentary section of the adjustable hinge connection shown in Figure 7.
Figure 9:
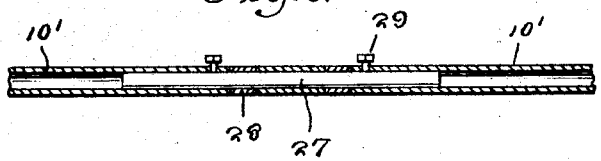
Figure 9 is an enlarged fragmentary section showing the means for regulating the width of the frame sections of the form of the invention shown in Figures 7 and 8.

In Figures 7, 8 and 9 of the drawings there is illustrated a modified form of frame in which the frame sections A′ are connected by means of an adjustable hinge connection. This hinge connection comprises a pivot bolt 25 which may be positioned in any one of a number of spaced openings 25′ provided in the adjacent ends of the frame sections so as to regulate the length of the side members of the frame. The end members 10′ of the frame sections A′ are formed in sections and the sections are connected by means of an intermediate section 27 whose opposite ends telescope within the adjacent ends of the end members 10′. Spacing sleeves 28 may be provided upon the intermediate section, while set screws 29 hold this section in place.

The frame sections A′ are covered with a wire netting 14′ whose edges are secured to the frame sections as shown at 30, while the adjacent edges of the wire netting 14′ are connected as shown at 31.

The invention is susceptible of various changes in its form, proportions and minor details of construction and the right is herein reserved to make such changes as properly fall within the scope of the appended claims.

Having described the invention what is claimed is:—

1. The combination with a pen having bedding therein, of means adapted to extend over the bedding to hold the latter in place, means whereby the bedding holding means may be secured in position and means included in said holding means whereby the latter may be arranged to provide a partition for the pen.

2. In combination with a pen having bedding therein, a device for holding the bedding in position, said device comprising a pair of frames hingedly connected together at their abutting edges, wire mesh covering the frames and means for connecting the frames to the pen.

3. In combination with a pen having bedding therein, a device for holding the bedding in position, said device comprising a pair of frames hingedly connected together at their abutting edges, wire mesh covering the frames, guard rails adjustably connected to the sides of the frames and hooks carried by the rails for removable engagement with the pen.

4. A bedding holder for pens comprising a pair of frames hingedly secured together, guard rails adjustably connected to and extending within the frames and means carried by the frames for removable engagement with a pen.

5. A bedding holder for pens comprising a pair of frames hingedly secured together, guard rails extending within the frames, pivotally adjustable means for holding the guard rails in position and means carried by the frames for removable engagement with the pen.

In testimony whereof I affix my signature.

JAMES A. DICKEL.